United States Patent [19]

Mannschke

[11] Patent Number: 4,838,636
[45] Date of Patent: Jun. 13, 1989

[54] OPTICAL STAR COUPLER

[75] Inventor: Lothar Mannschke, Eckental-Eckenhaid, Fed. Rep. of Germany

[73] Assignee: U.S. Philips Corp., New York, N.Y.

[21] Appl. No.: 105,052

[22] Filed: Oct. 5, 1987

[30] Foreign Application Priority Data

Oct. 7, 1986 [DE] Fed. Rep. of Germany ....... 3634064

[51] Int. Cl.$^4$ ................................................ G02B 6/28
[52] U.S. Cl. ................. 350/96.16; 350/96.10; 350/96.15
[58] Field of Search ............... 350/96.13, 96.14, 96.15, 350/96.16

[56] References Cited

U.S. PATENT DOCUMENTS

| | | | |
|---|---|---|---|
| 4,262,992 | 4/1981 | Berthold, III | 350/96.14 |
| 4,484,794 | 12/1984 | Witte | 350/96.16 |
| 4,515,428 | 5/1985 | Findakly | 350/96.16 |
| 4,535,440 | 8/1985 | Mannschke | 350/96.15 X |
| 4,609,252 | 9/1986 | Wong et al. | 350/96.15 |

FOREIGN PATENT DOCUMENTS 2340020 2/1975 Fed. Rep. of Germany .

OTHER PUBLICATIONS

Hoffman et al., "Low-Loss Multiple-Branching Circuit Ti-Indiffused LiNbO$_3$ Channel Waveguides", Optics Letters, vol. 9, No. 6, Jun. 1984, pp. 246-248.

Hoffman et al., "Report of the First European Conference on Integrated Optics", London, 14/15, Sep. 1981, pp. 1-3.

Findakly et al., "Single-Mode Integrated Optical 1 X N Star Coupler", Appl. Phys. Lett., 40 (7), Apr. 1, 1982, pp. 549, 550.

Primary Examiner—William L. Sikes
Assistant Examiner—Akm E. Ullah
Attorney, Agent, or Firm—Ernestine C. Bartlett

[57] ABSTRACT

The invention relates to an optical star coupler comprising cascaded three-ports, a three-port being formed by branching branch circuits into a center channel, a tapered region being provided at the branch point. The star coupler can be of a compact structure and preferably has a short length.

The branch angle between the branching side circuits and the center channel is greater than/equal to 2.5° and the tapered region is reduced.

10 Claims, 1 Drawing Sheet

OPTICAL STAR COUPLER

FIELD OF THE INVENTION

The invention relates to an optical star coupler comprising cascaded three-ports, a three-port being formed by branching branch circuits into a central circuit and a tapered region being provided at the branch point.

BACKGROUND OF THE INVENTION

Optical communication requires optical components which distribute the power of individual channels from n incoming channels over n outgoing channels. When the number of channels exceeds 2, these components are designated as star couplers. These couplers should have the lowest possible insertion losses and distribute the power as uniformly as possible over the n outgoing channels, independent of the excitation mode.

DE-OS No. 30 which corresponds substantially to U.S. Pat. No. 4,484,794, 36 044 discloses an optical star coupler in which two optical fibre bundles are interconnected via a mixer element designed as a planar waveguide. The mixer element has a thickness which is substantially equal to the fibre diameter. The optical fibres incoming at its output and outgoing from its output are located in the same plane and are coupled such that their packing density is as great as possible. The diameter of the optical fibres is substantially equal to the core diameter of the system fibres to be connected to the star coupler. The mixer element operates together with the incoming optical fibres coupled thereto as an optical multiplexer or an optical coupler, while the mixer element together with the outgoing optical fibres operates as an optical branching device.

An optical branching device is disclosed in DE-OS No. 23 40 020. This branching device is in the form of a three-port and can be produced in planar technique for both multimode and singlemode fibres.

Integrated single-mode opical 1×N star couplers are extensively described in Appl. Phys. Lett. 40 (7) dated Apr. 1st, 1982 on Pages 549 to 550. One of the configurations illustrated in FIG. 1 on Page 549 is implemented from cascaded three-ports. A light-conducting center channel is provided at which the three-ports are arranged sequentially. At each three-port each time one branching circuit is inclined from each side under the same angle to the center channel. In the embodiment shown the branching circuits are not connected to the center channel. There is, to the contrary, a defined distance between them. The influences of the value of this distance and also the angle at which the branching circuits lead into the center channel are indicated. Because of the narrow branch angle the arrangement must be of a great length.

DE-OS No. 32 30 657 which corresponds substantially to U.S. Pat. No. 4,535,440, discloses an optical multiplexer constituted by cascaded three-ports which can also be utilized as a branching device. A light-conducting center channel is provided at which the three-ports are arranged sequentially and at each three-port a branching cirucit leads from each side at the same angle into the center channel. A branch angle of approximately 1.5° is mentioned as being particularly advanatageous. The insertion losses at the three-ports are low and always the same. The light-conducting circuits are produced in a solid body made of, for example, boron oxide silicate glass in that ions which change the refractive index are introduced along desired paths, using a mask metal. A different method of producing these light-guiding circuits is disclosed in, for example, the report of the "First European Conference on Integrated Optics" London, 14/15 September 1981, by D. Hoffmann and U. Langmann, Pages 1–3. A $LiNbO_3$ solid body is used as the substrate. The paths are produced by indiffusion of titanium ions.

In the article "Low-loss multiple-branching circuit Ti-indiffused $LiNbo_3$ channel waveguides" in Optics Letters, Volume 9, no. 6, dated June 1984, Pages 246 to 248, the properties of a three-port manufactured using integrated circuit techniques are investigated. This article describes the analysis of the branch angle dependence of the power distribution between the middle branch to the sum of the outer branches wherein the branch angles investigated have values between 0.2° and 2.5°.

SUMMARY OF THE INVENTION

The invention has for its object the provision of an optical star coupler comprising cascaded three-ports, wherein a three-port is formed by branching branch circuits into a central circuit and a tapered region is provided at the branch point and wherein the optical star coupler can be of a compact structure and more specifically is of a short length and for which the attenuation or over-coupling is adjustable to a predetermined value.

According to the invention, this object is accomplished in that the branch angle between the side channels and the center channel is greater than or equal to 2.5° and the tapered region is reduced.

Advantageous embodiments of the invention are obtained when the confinement factor for the fundamental mode is chosen to exceed 0.9 for all single mode or substantially single mode conductor lines and/or when sections of the center channel between the three-ports are always of a constant width and the width of the sections increase from the coupling-in or coupling-out side to the center

DETAILED DESCRIPTION OF THE INVENTION

The invention and its advantages will now be described by way of example in greater detail with reference to an embodiment shown in the accompanying FIGS. 1 and 2.

Figure 1:
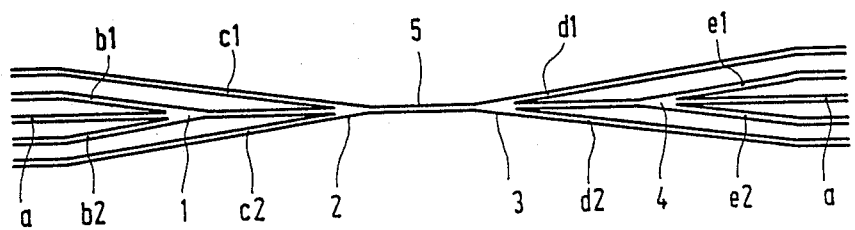
FIG. 1 is a perspective view of a star coupler of the invention.
Figure 2:
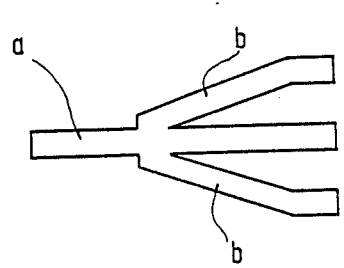
FIG. 2 is a plan view of one version of a branch or three-port.

FIG. 1 illustrates a star coupler formed by cascaded three-ports. the star coupler includes a continuous center channel a which corresponds to the continuous center channel of the optical multiplexer disclosed in DE-OS No. 32 30 657 (U.S. Pat. No. 4,535,440). Two further channels b1 and b2 are branched into this center channel at a first three-port 1. The further channels c1 and c2 are branched into this center channel at a second three-port 2. Two conductor lines d1 and d2 are branched off at three-port 3 and two further conductor lines e1 and e2 are branched off at the subsequent three-port 4. By joining the light-guiding channels a tapered region is created at each three-port. Each section of the center channel between the individual three-ports always constitutes a mixer zone. The individual sections of the center channel a have from three-port to three-port a constant width which in section 5 between the three-ports 2 and 3 is greater than in the adjacent sections between the three-ports 1 and 2 and between the three-ports 3 and 4, the width of these last-mentioned sections being equal to each other but greater than in the end sections. The width of the center channel sections is dimensioned such that always i modes can be acquired, wherein i is an odd number. Five modes can be obtained in the region 5 between the three-ports 2 and 3. This region is of such a length that a desired intimate mixing of the modes is effected, so that at the coupling-out side a predetermined distribution of the energy is available, for example in such a manner that at the coupling-out side the output power is equal. The length of the further sections is based on the dimensions of the optical waveguides which are coupled to the exterior, and also on the angles between the channels. The optical waveguides coupled to the exterior are provided adequately closely to each other, so that the outer sides of their cladding are contiguous to each other.

Depending on the wavelength and what is commonly referred to as the confinement factor C, the conductor lines b1 to e2 are preferably of a single-mode structure or of a number of modes V less than or equal to four or of a multimode structure with a number of modes V slightly higher than four, which also applies to the conductor line a from the input to the first three-port 1 and from the three-port 4 to the output. The number of modes V is the product of the wave constants of the conductor line, the width of the conductor line and the numerical aperture.

The confinement factor indicates how much energy of the overall field in the core of the optical waveguide or in the conductor channel, respectively, is transmitted. In a preferred embodiment, the confinement factor for the fundamental mode exceeds 0.9 for all the single-mode or substantially single-mode channels. This significantly contributes to the star coupler being particularly low in attentuation. The star coupler can be produced in known manner without any problems for example in accordance with one of the prior art methods already mentioned in the opening paragraph.

The coupled-out or coupled-in power, respectively, depends on the configuration of the three-ports, which is described with reference to FIG. 2. FIG. 2 is, at an enlarged scale, a more detailed illustration of a three-port. This type of three-port is particularly suitable in this embodiment for single-mode or substantially single-mode narrow angle in-branching. The ("inner") bounding lines, which are adjacent to the center channel, of the channels b which branch into the center channel at a sharp angle, extend in a straight manner, the angle between them and the bounding lines of the center channel a is equal to the branch angle. The outermost bounding lines of the in-branching channels b extend in the convergence region only to the branch position, approximately parallel to the inner bounding lines. In the region of the branch point they meet the center channel at approximately a square angle, so that the length of the branch point and consequently the tapered region is short. The choice of the length of the branch point can be determined by the extent of over-coupling and indeed independently of the branch angle, so that for the same compact structure the over-couplings can be chosen differently.

What is claimed is:

1. An optical star coupler comprising at least two cascaded three-ports, each three-port being formed by branching side channel branch circuits into a mixer zone comprising a continuous, central channel comprising a tapered region at the branch point,
   wherein the branch angle between the side channels and the center channel is greater than or equal to 2.5° and the tapered region is reduced.

2. An optical star coupler as claimed in claim 1 wherein the side channels comprise conductor lines that are all of a single mode or substantially single mode structure and a confinement factor for the fundamental mode is chosen to exceed 0.9 for all single-mode or substantially single-mode conductor lines.

3. An optical star coupler as claimed in claim 1 or 2 herein the three-ports comprise coupling-in and coupling-out sides; the sections of the center channel between the three-ports are of a constant width; and the width of the sections of the center channel increases from the coupling-in side and coupling-out side to the center.

4. An optical star coupler which comprises:
   (a) a continuous center channel;
   (b) two channels branched into the center channel at a first three-port;
   (c) two channels branched into the center channel at a second three-port;
   (d) two conductor lines branched off the center channel at a third three-port;
   (e) two further conductor lines branched off of the center channel at a fourth three-port; and
   (f) a tapered region formed at each three-port branching point;
   wherein each section of the center channel between two three-ports constitutes a mixer zone; the mixer zone between each three-port is a constant width;
   the width of the sections increases from the coupling-in or coupling-out side to the center; the branch angle between the side channels or the conductor lines and the center channel is greater than or equal to 2.5°; and the tapered region is reduced.

5. An optical star coupler as claimed in claim 4 wherein the width of the mixer zone between the second and third three-ports is greater than the width of the mixer zones between (a) the first and second three-ports and (b) the third and fourth three-ports.

6. An optical star coupler as claimed in claim 5 wherein the width of the center channel sections is dimensioned so that i modes can be acquired wherein i is an odd number.

7. An optical star coupler as claimed in claim 6 wherein i is 5 in the mixer zone between the second and third three-ports.

8. An optical star coupler as claimed in claim 7 wherein a predetermined distribution of energy at the coupling-out side is available.

9. An optical star coupler as claimed in claim 5 wherein the conductor lines and channels are of single-mode or substantially single-mode structure.

10. An optical star coupler as claimed in claim 9 wherein the confinement factor for the fundamental mode exceeds 0.9 for all single-mode or substantially single-mode channels and conductor lines.

* * * * *